March 17, 1970  E. C. FITCH, JR., ET AL  3,501,014
REGENERATIVE HYDROCYCLONE
Filed June 13, 1968

INVENTORS.
ERNEST C. FITCH, JR.
ROBERT E. REED
ALVA G. COMER

BY

Head & Johnson
ATTORNEYS

United States Patent Office 3,501,014
Patented Mar. 17, 1970

3,501,014
REGENERATIVE HYDROCYCLONE
Ernest C. Fitch, Jr., Robert E. Reed, and Alva G. Comer, Stillwater, Okla., assignors to Oklahoma State University, Stillwater, Okla., a corporation of Oklahoma
Filed June 13, 1968, Ser. No. 736,817
Int. Cl. B01d 43/00, 35/16
U.S. Cl. 210—512                                11 Claims

ABSTRACT OF THE DISCLOSURE

This invention relates to a regenerative hydroclone for the separation of entrained solid particles from a fluid medium. More particularly, the invention relates to a hydroclone for the separation of solid contaminant particles suspended in a fluid medium, the hydroclone being a closed vessel having a coaxial cylindrical and conical portion, the cylindrical portion providing a cylindrical interior surface closed at one end and having an axial clean fluid outlet opening in the closed end, a fluid inlet tangentically intersecting the interior cylindrical surface, the conical portion defining an internal conical surface coincident at one end with the internal cylindrical surface of the cylindrical portion and tapering to a reduced diameter contaminant discharge opening, and wherein the parameters for given rates of flow and densities of the fluid medium are established such that the effectiveness of the hydroclone for the separation of solid contaminants is increased.

Cross references

This application is not related to any pending United States or foreign application.

Summary

The use of cyclonic devices for separating entrained solid particles from a fluid medium is well known. While such devices are referred to by various names, devices particularly intended to extract entrained solid particles from fluid are usually referred to as hydroclones.

Reference may be had to United States Patent No. 3,235,090, issued Feb. 15, 1966, entitled Hydroclone, for a discussion of various features and arrangements of hydroclone apparatus which have proved successful in many applications.

The basic concept by which a hydroclone functions is relatively simple. Fluid is forced into a cylindrical enclosure and caused to flow in an outer circuitous path. Fluid migrates from this outer circuitous path towards the interior where it is withdrawn through a central opening. Since the fluid migrates in a direction opposite the radial forces affected in the whirling fluid, dense contaminants are left to the outside while the clean fluid passes to the interior and out the hydroclone. The denser components remain on the outer circumference of the whirling fluid column and pass downwardly and out of the hydroclone. A conical configuration of the container wherein the whirling fluid is maintained increases the effectiveness of separation of entrained contaminants from the fluid medium.

Present hydroclones which have been designed to separate very small particles from heavy or viscous fluids are of designs wherein high input energies are required in terms of input pressures and wherein high energy losses are incurred. The reason is that such known hydroclone designs have resulted essentially in an arrangement wherein the full fluid flow energy drop through the hydroclone is converted into force imparting inertia to the whirling fluid. While in some installations a large amount of power consumption may be tolerated in a hydroclone to achieve a desired effectiveness, in many other applications such high energy losses cannot be tolerated. In some prospective applications the high energy loss makes known types of hydroclones not economically justifiable. In those instances wherein the high energy losses of hydroclones have not been tolerable in the present, various filter and other arrangements have been utilized as a means of extracting solids from liquids. Filters, however, are unsatisfactory in many applications since filters, by their nature, require substantial amounts of attention and maintenance and usually require frequent replacement. In addition, filters are notoriously ineffective for the removal of micronic particles and, in addition, when filters become filled or covered with removed particles, pressure drop increases dramatically.

A hydroclone overcomes the disadvantages of a filter in that it provides means for disposing of extracted solids without replacement of elements, and in an arrangement wherein the pressure drop remains substantially constant.

This invention provides a hydroclone which is, in effect, regenerative, that is, in which a high separation energy is established between liquid and contaminants with the pressure drop across the hydroclone being required only in an amount sufficient to overcome frictional loss. The improved efficiency and effectiveness of the hydroclone of this invention make it possible to use hydroclones in applications wherein present types are not usable, or wherein present types are not as effective as desired.

Description of views

Detailed description

Figure 1:
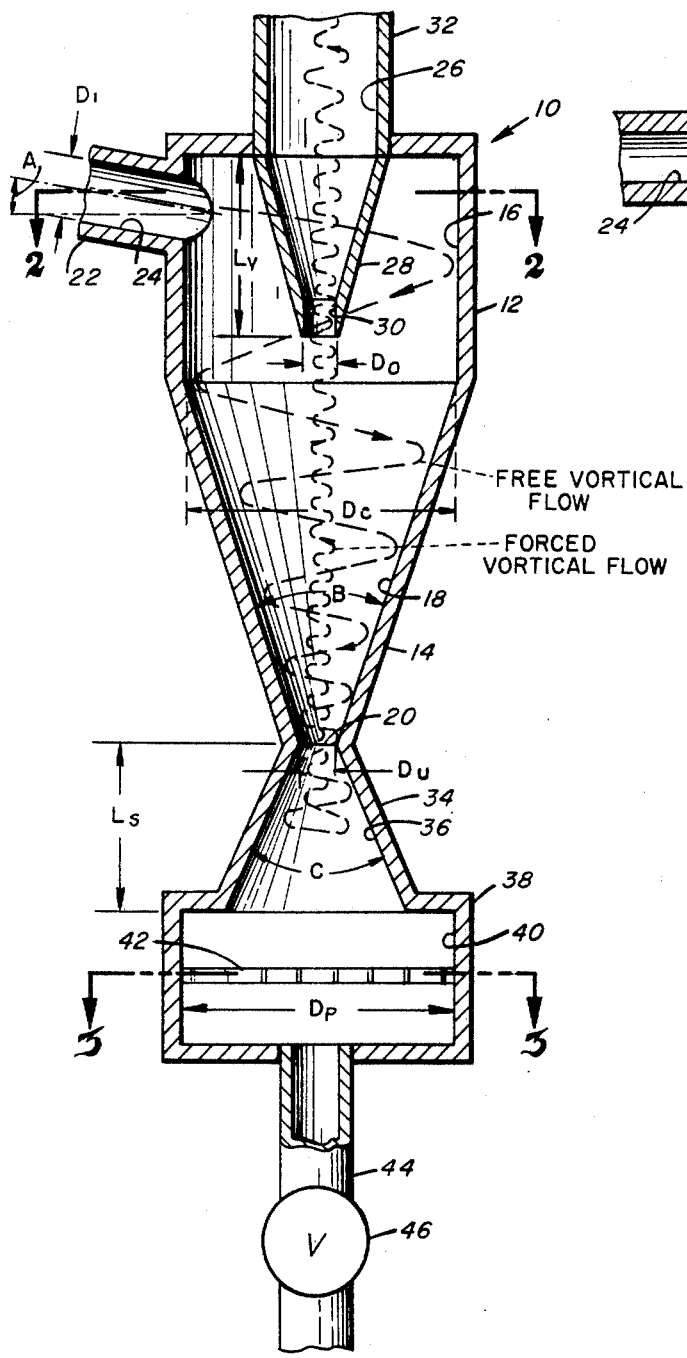
FIGURE 1 is a cross-sectional view of a hydroclone showing the various parameters which are involved in the design according to the practice of this invention to meet varying volumes, fluid viscosities and densities, particle sizes and densities, and separation effectiveness conditions.

Referring to the drawings, the hydroclone consists of a closed vessel generally indicated by the numeral 10, including a cylindrical portion 12 and a coaxial conical portion 14. The cylindrical portion defines a cylindrical interior surface 16 and the conical portion defines an interior conical surface 18. The interior conical surface 18 is coincident at the upper end with the interior cylindrical surface 16 and tapers to a reduced diameter vortical opening 20 at the lower end.

Figure 2:
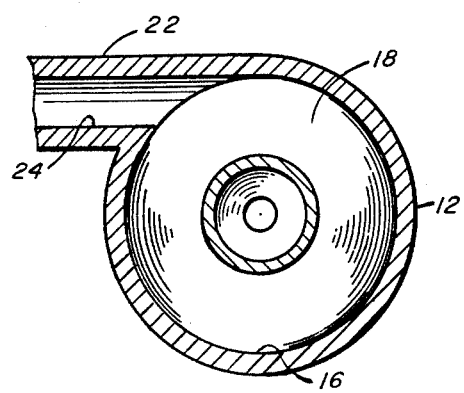
FIGURE 2 is a cross-sectional view taken along the line 2—2 of FIGURE 1.
Figure 3:
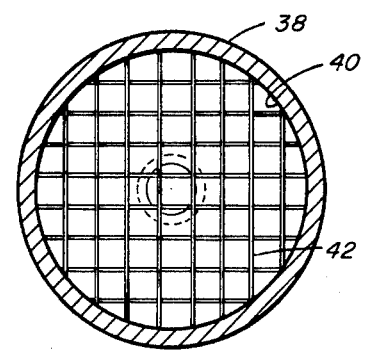
FIGURE 3 is a cross-sectional view of the underflow portion of the invention showing one arrangement of a grid system therein, taken along the line 3—3 of FIGURE 1.

Intersecting the interior cylindrical surface 16 tangentially thereto, as best seen in FIGURE 2, is a fluid inlet conduit 22 having a fluid inlet opening 24. The cylindrical portion 14 is provided with a coaxial fluid outlet 26 at the end thereof opposite the conical portion 14, and includes a vortex finder 28 which extends coaxially within the interior of the cylindrical surface 16. The vortex finder 28 is coincident at one end with the fluid outlet 26 and tapers to a clean fluid outlet opening 30. A conduit 32 communicates with the clean fluid outlet 26 to convey clean fluid away from the hydroclone.

Affixed to the lower end of conical portion 14 is a subconical portion 34 having an interior conical surface 36. The interior surface of subconical portion 36 is coaxial with conical surface 18 and cylindrical surface 16 and expands in an enlarged diameter away from the vortical opening 20.

The lower end of the subconical portion 34 communicates with a contaminant collection chamber 38 having internal diameter 40. The function of chamber 38 is to provide a quiescent settling zone wherein contaminants ejected from the fluid in the upper portion of the hydroclone may settle and it provides a means for breaking up a vortical fluid flow. Grid system 42 is preferably provided in chamber 38 to assist in the disruption or breaking up of vortical fluid flow. The function of the grid 42 is to induce downward linear fluid flow within the collection chamber 38 so that contaminants extracted in the hydroclone will settle out. A conduit 44 is shown communicating with collection chamber 38 providing means whereby contaminants may be carried away. A valve 46 is provided in conduit 44 to control the rate of flow of contaminant bearing fluid out of the collection chamber.

In one arrangement the collection chamber 38 may be closed and the contaminants permitted to collect therein, the chamber being occasionally removed from the hydroclone for disposal of the contaminants. In the arrangement illustrated, fluid flow down through the collection chamber may be utilized to carry the contaminants away. Such fluid flow may be continuous as a small proportion of the fluid passing through inlet 22, or the flow may be controlled in a sequence of periodic dumping cycles.

The hydroclone described up to the present may be considered of a known basic configuration. This invention relates to the arrangement of the parameters of such a hydroclone configuration wherein regenerative effect is achieved to obtain greatly improved separation efficiencies.

As has been previously stated, hydroclone separators which have been designed to date are of the pure inertial type. These presently known units require high input energy levels in order to achieve separation effectiveness. The fluid momentum required to produce a given separation must be supplied entirely by a high rate of fluid injection, that is, such known hydroclone designs require high power inputs to produce the necessary acceleration forces on the particles to obtain separation.

By the principles of this invention, a new concept is achieved which has not been known or practiced before to the knowledge of applicants. A hydroclone having parameters defined by this invention may be described as a regenerative energy type as compared to the pure inertial energy types of the presently known arrangements. In a hydroclone having the parameters of this invention, which parameters will be described subsequently, high separation energy levels are maintained requiring only sufficient energy to overcome losses. The actual work required to separate a micronic size particle from a fluid is very insignificant even though a high fluid momentum level is required. High separation efficiencies are achieved in this invention by a strong vortical field whose energy losses are supplied by low input power.

The theory of the regenerative hydroclone of this invention may be stated as follows: When a fluid is forced through a given hydroclone unit, a vortical flow system is created. This vortical flow system consists of both a free and a forced vortex as identified by dashed lines in FIGURE 1. Fluid enters the conical section feeding the free vortex, the outer boundary of which is established by the conical surface 18. The inner boundary of the free vortex is the outer boundary of the forced vortex. In turn, fluid from the free vortex establishes and feeds the forced vortex whose axis of zero tangential velocity is coincidental to the axis of conical surface 18 and vortex finder opening 30. When such a vortex system is formed, pressure gradients are established according to the physical parameters constituted by the mechanically constrained fluid motion. That is, the velocity gradients, which are controlled by the arrangement of the physical configuration and parameters to be described, are accompanied by corresponding pressure gradients congruent with the established steady state energy levels of the operating system.

Such regeneration in the hydroclone system of this invention is accomplished by taking advantage of the reversible energy conversion phenomena in fluids where kinetic energy is converted into pressure energy and vice-versa. This conversion is possible within a hydroclone of this invention since major pressure gradients are created by the motion of the fluid mass and not by frictional losses. The final result is a pressure potential rather than a dissipative pressure drop. The motion of the fluid mass creates a pressure gradient while at the same time the reversible energy associated with the pressure gradient tends to support an identical motion. Therefore, when sufficient external energy is introduced in the system to overcome the losses due to friction, the system becomes self-sustaining on a steady state basis, and thus the hydroclone may be said to be regenerative.

The invention utilizes a low input power to establish a high energy level within the hydroclone in order to accomplish a given separation. A high energy level is caused to establish a vortical field which extends past the conical vortical opening 20 and into the subcone 34 as illustrated.

In order to achieve regenerative cyclonic separation in the hydroclone of FIGURE 1, it is necessary to specify certain combinations of configurations and parameters in accordance with definite mathematical relationships. The relationships of the components and parameters of the hydroclone of this invention can most effectively be expressed mathematically, the symbols having the following meanings:

$D_c$=diameter of cylindrical surface 16 and largest diameter of conical surface 18 in inches
$D_1$=diameter of inlet opening 24 in inches
$D_o$=diameter of outlet opening 30 of vortex finder 28 in inches
$D_u$=diameter of conical vortical opening 20 in inches
$D_p$=diameter of particles to be separated in microns
$L_v$=length of vortex finder 28 in inches
$L_s$=length of subcone portion 34 in inches
A=angle of axis of inlet 22 relative to a plane perpendicular to axis of cylindrical portion 12 in degrees
B=angle of the sides of interior conical surface 18 in a plane of the conical axis in degrees
C=angle of the sides of interior surface 36 subcone portion 34 in a plane of the conical axis of the subcone portion in degrees
$P_d$=density of contaminant particles to be separated in the hydroclone in grams per cubic centimeter
$D_f$=density of fluid to be passed through the hydroclone in grams per cubic centimeter
$F_d$=viscosity of the fluid to be passed through the hydroclone in centipoises
Q=rate of flow of fluid through the hydroclone in gallons per minute First, it may be stated that in order to accomplish a given particle separation from a fluid a minimum level of fluid momentum is required. When the following relationship is satisfied, this minimum energy level exists within the hydroclone:

$$\frac{Q(P_d-D_f)D_p^2}{F_d D_c \tan B} = \text{constant}$$

When this relationship is established, particle separation is achieved in the hydroclone arrangement whether regeneration occurs or not. However, in the absence of the relationship of components and parameters to establish regeneration, the total energy required for the particle separation must occur as energy drops from the fluid flowing through the system.

The regenerative hydroclone of this invention is achieved by arranging the components and parameters in such a way that for any given flow rate, fluid viscosity, fluid density and particle density, four basic relationships are established, this in order to achieve regenerative effect within a hydroclone and to thereby achieve a particle separation with an energy loss not achievable with prior known direct inertia type devices. The relationships required are:

Relationship 1

$$\frac{D_c\sqrt{\sin A}}{D_1 D_f} = K_1$$

or expressed another way $$\sin A = \left(\frac{K_1 D_1 D_f}{D_c}\right)^2$$

wherein $K_1$ is a constant equal to at least 1.0 and not more than 2.0.

Relationship No. 1 is particularly important to define the inlet geometry of a specilc size hydroclone and is particularly important in promoting the regenerative energy phenomena.

Relationship 2

$$\frac{D_o D_1}{D_u L_v} = K_2$$

wherein $K_2$ is a constant equal to at least 0.2 and not more than 0.8.

The Relationship No. 2 is important in order to obtain the proper separation efficiency, to establish the required fluid flow pattern, and to produce the proper pressure condition within the hydroclone.

Relationship 3

$$\frac{C}{B} = K_3$$

wherein $K_3$ is a constant equal to at least 1.0 and not more than 2.0.

Relationship No. 3 which establishes the ratio of the conical and subconical angles is important in order to diminish the tangential velocity of the fluid that enters the subcone section 34 and to minimize the fluid circulation in the collection chamber 38.

Relationship 4

$$\frac{Q F_d \tan B}{(D_c - D_u)^3} = K_4$$

or expressed another way $$\tan B = \frac{K_4 (D_c - D_u)^3}{Q F_d}$$

wherein $K_4$ is a constant equal to at least 0.02 and not more than 0.20.

Relationship No. 4 is important in establishing the configuration of the conical surface 18.

A hydroclone having the relationship of components and parameters as described with reference to Relationships 1 through 4 has the following advantages over known inertial type hydroclone designs:

(1) Better separation is achieved for the reasons that
(a) the pinch zone or flow reversal zone occurs in the subcone section 34 rather than in the conical section 14 as is the case with known inertial type hydroclone arrangements;
(b) the downward flow of fluid and contaminants occurs past the vortical opening 20;
(c) gravitational forces are helpful to cause the contaminant to pass outwardly into the collection chamber 38 although not mandatory and the hydroclone may be oriented in any desired arrangement; and
(d) the forced vortex is larger, making separation on the basis of size and shape as well as by density differentials alone.

(2) A lower pressure drop is achieved in the regenerative hydroclone of this invention because:
(a) the conical portion 14 is generally larger, giving more flow area; and
(b) the vortex system is maintained by regenerative pressure gradients in the conical section.

Generally speaking, the relationships of components as set out in Relationships 1 through 4 produce a hydroclone unit which is distinguished from known types of hydroclone units in the following ways:

(1) Higher inlet velocities are utilized.
(2) The inlet angle A is greater.
(3) The angle B of the conical surface 18 is greater.
(4) The length $L_c$ of the conical portion 12 is less.
(5) The length $L_v$ of the vortex finder is greater.
(6) The outlet diameter $D_o$ of the vortex finder is decreased.
(7) The diameter $D_p$ of the collection chamber 38 is greater.
(8) Continuous discharge of contaminant bearing fluid from the chamber 38 by way of conduit 44 is provided.

One of the important effects of the relationship of components and parameters as established by Relationships 1 through 4 is the provision of means of maintaining a positive fluid pressure in subcone 34. If a positive fluid pressure is not maintained in the subcone, several disadvantageous effects may occur including (a) the pressure may fall below the vapor pressure of the fluid causing bubbles to form which transports contaminants up and out of the collection chamber, such bubbles may also in certain circumstances serve to block the vortical opening 20; (b) degassing of the fluid may occur creating bubbles, even if the pressure is not below the vapor pressure of the fluid itself; (c) such low subcone pressure creates vertical recirculation of contaminants in the collection chamber causing entrainment in the upward stream; (d) control of underflow out of the collection chamber is difficult resulting in pulsating flow or even reversed fluid flow tending to carry the contaminants up out of the collection chamber; (e) a low separation efficiency results; and (f) in order to achieve a degree of separation efficiency to overcome these problems, a higher pressure for a given flow rate may be required because of the existance of bubbles. Thus, by incorporating the Relationships 1 through 4, these problems which exist in some known types of hydroclones are eliminated.

In addition, other characteristics which result from the Relationships 1 through 4 and which distinguish the regenerative hydroclone of this invention over the prior art are:

(1) Residence time of both the fluid and contaminant in conical section 14 is increased.
(2) Radial velocity of fluid is reduced in conical section 14, hence drag forces on particles are lower, yielding better terminal separation.
(3) Radial distances are increased to make separation easier, less sensitive to underflow characteristics.
(4) Vertical fluid circulation in the cylindrical section 12 is minimized, thus reducing the short circuit effects; that is, the direct passage of contaminants from the inlet 22 to the vortex finder outlet opening 30 is greatly reduced.
(5) Lower pressure drop in the hydroclone is experienced.

Some results of the relationship of components established in Relationships 1 through 4 are:

(1) Cavitation in the upper cylindrical section 12 is minimized.
(2) Fully developed flow through inlet 22 is achieved.
(3) Flow interference in the cylindrical portion 14 is minimized.
(4) Pressure drop in the vortex finder 28 is significantly reduced.
(5) Effectiveness of separation has been obtained wherein contaminants having less density than the fluid medium may be extracted under certain circumstances.

(6) Higher flow rates for given pressure with efficient separation is achieved.

(7) Pressure-flow relation has indicated an exponent as low as 1.33 instead of the normal 2.00.

(8) Emphasis is given to the size and shape of particles to be separated in addition to the differences of density between the contaminate particles and the fluid medium.

In addition to the Relationships 1 through 4 which achieve the regenerative effect of the hydroclone of this invention, it has been learned that in order to minimize the re-entrainment of contaminants into the forced vortex stream within subcone 34 wherein vortical flow reversal occurs (rather than in conical portion 14 as in prior hydroclone designs) and to maintain a positive collection chamber pressure, the subcone 34 must exhibit a configuration established by:
Relationship 5

$$K_5 = \frac{F_d \sqrt{Q}}{L_s D_u}$$

wherein $K_5$ is a constant equal to at least 1.2 and not more than 3.0.

Relationship 5 is not critical to establishing a regenerative energy unit and therefore not indispensable to the basic concept of the invention, however, it is highly desirable that this relationship be maintained in order to achieve the most effective separation.

To illustrate the practical application of the invention to provide hydroclones designed for specific conditions, the parameters for two hydroclones which have been successfully applied will be given.

The first illustration is a hydroclone to remove aluminum cuttings from machine tool coolant. The conditions are:

Flow rate, Q, 20 gallons per minute
Fluid density, $D_f$, 1 gram per cubic centimeter
Fluid viscosity, $F_d$, 1 centipoise
Particle density, $P_d$, 4.5 grams per cubic centimeter
Particle diameter, $D_p$, 4 microns A hydroclone which is successful to separate aluminum contaminate particles from machine tool coolant under the above defined conditions and satisfies each of the Relationships 1 through 5 has the following parameters:

A=5°  $D_u$=.435 inch
B=10°  $L_v$=4.125 inches
C=14°  $L_s$=4.0 inches
$D_c$=3.50 inches  $D_o$=.875 inch
$D_1$=.875 inch These parameter values satisfy Relationship No. 1 wherein the value of $K_1$ is 1.18; Relationship No. 2 wherein the value of $K_2$ is .425; Relationship No. 3 wherein the vaule of $K_3$ is 1.4; Relationship No. 4 wherein the value of $K_4$ is .1216; and Relationship No. 5 wherein the value of $K_5$ is 2.57.

The second illustration is a hydroclone to remove silicon particles in the form of fine sand from et engine fuel. The conditions are:

Flow rate, Q, 200 gallons per minute
Fluid density, $D_f$, .77 gram per cubic centimeter
Fluid viscosity, $F_d$, 2.2 centipoises
Particle density $P_d$, 2.6 grams per cubic centimeter
Particle diameter, $D_p$, 7.0 microns A hydroclone which is successful to separate silicon particles from jet engine fuel under the above conditions and which satisfies each of the Relationships 1 through 4 has the following parameters:

A=5°  $D_u$=1.0 inch
B=20°  $L_v$=12.187 inches
C=28°  $L_s$=11.0 inches
$D_c$=12.25 inches  $D_o$=3.0 inches
$D_1$=3.0 inches These parameter values satisfy Relationship No. 1 wherein the value of $K_1$ is 1.57; Relationship No. 2 wherein the value of $K_2$ is .74; Relationship No. 3 wherein the value of $K_3$ is 1.4; Relationship No. 4 wherein the value of $K_4$ is .105; and Relationship No. 5 wherein the value of $K_5$ is 2.83.

What is claimed:

1. A hydroclone for the separation of solid contaminate particles suspended in a fluid medium including a cylindrical portion and a conical portion coaxial therewith, the cylindrical protion defining a cylindrical interior surface and being closed at one end, the closed end having an axial clean fluid outlet opening therein, a fluid inlet tangentially intersecting said interior cylindrcal surface, the conical portion defining an internal conical surface coincident at one end with the internal cylindrical surface of said cylindrical portion and tapering to a reduced diameter vortical opening, and wherein said axis of said inlet intersects said cylindrical portion at an acute angle relative to a plane perpendicular the cylindrical axis in the direction away from said closed end which satisfies the equation $$\sin A = \left(\frac{K_1 D_1 D_f}{D_o}\right)^2$$

in which equation A denotes said angle of said inlet, $D_1$ denotes the inlet internal diameter in inches, $D_f$ denotes the density of the fluid medium in grams per cubic centimeter, $D_c$ denotes the internal diameter of said cylindrical portion, and $K_1$ denotes a constant equal to at least 1 and not more than 2.

2. A hydroclone according to claim 1 including a subcone portion providing a conical surface coaxial with said conical surface of said conical portion, said conical surface of said subconical portion expanding in ncreased internal diameter away from said vortical opening, said internal conical surface communicating with an enlarged diameter collection chamber, wherein the ratio of the angle subtended by the interior sides of said conical surface of said subconical portion in a plane of the conical axis to the angle subtended by the interior sides of said interior conical surface of said conical portion in a plane of the conical axis is equal to at least 1 and not more than 2.

3. A hydroclone for separation of solid contaminate particles suspended in a fluid medium including a cylindrical portion and a conical portion coaxial therewith, the cylindrcal porton defining a cylindrical interior surface and being closed at one end, the closed end having an axial clean fluid outlet, a fluid inlet tangentially intersecting the interior cylindrical surface, the conical portion defining an internal conical surface coincident at one end with the internal cylindrical surface of said cylindrical portion and tapering to a reduced diameter vortical opening, wherein the equation $$K_4 = \frac{Q F_d \tan B}{(D_c - D_u)^3}$$

is satisfied in which Q denotes the flow rate of fluid medium through said fluid inlet in gallons per minute, $F_d$ denotes the viscosity of the fluid medium in centipoises, B denotes the angle subtended by the interior sides of said conical surface of said conical portion in a plane of the conical axis, $D_c$ is the internal diameter of said cylindrical portion, $D_u$ denotes the diameter of said vortical opening, and $K_4$ denotes a constant equal at least 0.02 and not more than 0.20.

4. A hydroclone according to claim 3 including a subcone portion providing a conical surface coaxial with said conical surface of said conical portion, said conical surface of said subconical portion expanding in increased internal diameter away from said vortical opening, said internal conical surface communicating with an enlarged diameter collection chamber, wherein the ratio of the angle subtended by the interior sides of said conical surface of said subconical portion in a plane of the conical axis to the angle subtended by the interior sides of said interior conical surface of said conical portion in a plane of the conical axis is equal to at least 1 and not more than 2.

5. A hydroclone for separation of solid particles suspended in a fluid medium including a cylindrical main portion and a conical portion coaxial therewith, the cylindrical portion defining a cylindrical interior surface and being closed at one end, the closed end having an axial clean fluid outlet, a fluid inlet tangentially intersecting the interior cylindrical surface, the main conical portion defining a main internal conical surface coincident at one end with the internal cylindrical portion and tapering to a reduced diameter vortical opening, a subcone portion providing a conical internal surface coaxial with said conical surface of said conical portion, said conical surface of said subconical portion having a reduced diameter opening coincident with said vortical opening and expanding in enlarged internal diameter away from said vortical opening, and a cylindrical collection chamber of enlarged internal dimensions coaxial with and communicating with said conical surface of said subcone portion, wherein the equation $$K_5 = \frac{F_d \sqrt{Q}}{L_s D_u}$$

is satisfied, in which $F_d$ denotes the viscosity of the fluid medium in centipoises, Q denotes the flow rate through said fluid inlet of said fluid medium in gallons per minute, $L_s$ denotes the length of the conical surface of said subcone portion measured parallel the conical axis thereof in inches, $D_u$ denotes the diameter of the vortical opening in inches, and $K_5$ is a constant having a value of at least 1.2 and not more than 3.0.

6. A hydroclone for the separation of solid contaminate particles suspended in a fluid medium including a closed vessel having a cylindrical portion and a conical portion coaxial therewith, the cylindrical portion defining a cylindrical interior surface and being closed at one end, the closed end having an axial clean fluid outlet opening, a fluid inlet tangentially intersecting said interior cylindrical surface, the conical portion defining an internal conical surface coincident at one end with the internal cylindrical surface of said cylindrical portion and tapering to a reduced diameter vortical opening, and wherein said axis of said inlet intersects said cylindrical portion at an acute angle relative to a plane perpendicular the cylindrical axis and away from said closed end, and including a vortex finder extending from said cylindrical portion closed end coaxially with said conical portion and having an axial clean fluid opening therethrough in alignment with the clean fluid outlet opening in said cylindrical portion closed end, wherein the equations $$\sin A = \left(\frac{K_1 D_1 D_f}{D_c}\right)^2$$

and $$K_2 = \frac{D_o D_1}{D_u L_v}$$

are satisfied, in which A denotes said angle of said inlet, $D_1$ denotes the inlet internal diameter in inches, $D_f$ is the density of the fluid medium in grams per cubic centimeter, $D_c$ is the internal diameter of said cylindrical portion, $K_1$ is a constant equal to at least 1 and not more than 2, $D_o$ denotes the internal diameter of said vortex finder in inches, $D_u$ is the diameter of said vortical opening in inches, $L_v$ denotes the length of said vortex finder in inches, and $K_2$ is a constant equal to at least 0.2 and not more than 0.8.

7. A hydroclone according to claim 6 including a subcone portion providing a conical surface coaxial with said conical surface of said conical portion, said conical surface of said subconical portion expanding in increased internal diameter away from said vortical opening, said internal conical surface communicating with an enlarged diameter collection chamber, wherein the ratio of the angle subtended by the interior sides of said conical surface of said subconical portion in a plane of the conical axis to the angle subtended by the interior sides of said interior conical surface of said conical portion in a plane of the conical axis is equal to at least 1 and not more than 2.

8. A hydroclone according to claim 6 wherein the additional equation $$K_4 = \frac{Q F_d \tan B}{(D_c - D_u)^3}$$

is satisfied, in which Q denotes the flow rate of fluid through said inlet in gallons per minute, $F_d$ denotes the viscosity of said fluid medium in centipoises, B is the angle subtended by the interior sides of said main conical portion in a plane of the conical axis, and $K_4$ is a constant having a value from 0.02 to 0.20.

9. A hydroclone according to claim 8 wherein the additional equation $$K_5 = \frac{F_d \sqrt{Q}}{L_s D_u}$$

is satisfied, in which $L_s$ denotes the length of said subconical portion as measured parallel the conical axis thereof and $K_5$ is a constant between 1.2 and 3.0.

10. A hydroclone for the separation of solid contaminate particles suspended in a fluid medium including a closed vessel having a cylindrical portion and a conical portion coaxial therewith, the cylindrical portion defining a cylindrical interior surface and being closed at one end, the closed end having an axial clean fluid outlet opening, a fluid inlet tangentially intersecting said interior cylindrical surface, the conical portion defining an internal conical surface coincident at one end with the internal cylindrical surface of said cylindrical portion and tapering to a reduced diameter vortical opening, and wherein said axis of said inlet intersects said cylindrical portion at an acute angle relative to a plane perpendicular the cylindrical axis and away from said closed end, and including a vortex finder extending from said cylindrical portion closed end and coaxially with said conical portion and having an axial clean fluid opening therethrough in alignment with the clean fluid outlet opening in said cylindrical portion closed end, a subcone portion providing a conical interior surface coaxial with said main conical surface, said conical surface of said subcone portion expanding in increased internal diameter in the direction away from said vortical discharge opening, and a collection chamber of enlarged diameter communicating with said internal conical surface, wherein the following relationships are satisfied:

$$K_1 = \frac{D_c \sqrt{\sin A}}{D_1 D_f}$$

$$K_2 = \frac{D_o D_1}{D_u L_v}$$

$$K_3 = \frac{C}{B}$$

$$K_4 = \frac{Q F_d \tan B}{(D_c - D_u)^3}$$

in which $D_c$ is the diameter of said cylindrical surface in inches, A is the angle of the axis of said inlet relative to a plane perpendicular the axis of said cylindrical portion, $D_1$ is the diameter of said inlet opening in inches, $D_f$ is the density of the fluid medium in grams per cubic centimeter, $K_1$ is a constant between 1.0 and 2.0,. $D_o$ is the diameter of said clean fluid opening of said vortex finder $D_u$ is the diameter of said vortical opening in inches as measured parallel the axis thereof, $L_v$ denotes the length of the vortex finder in inches, $K_2$ is a constant between 0.2 and 0.8, C is the angle of the sides of said conical surface of said subcone portion in a plane of the conical axis in degrees, B is the angle of the sides of said conical surface of said conical portion in a plane of the conical axis in degrees, $K_3$ is a constant between 1.0 and 2.0, Q is the rate of flow of fluid through said inlet in gallons per minute, $F_d$ is the viscosity of the fluid flowing through said inlet in centipoises, and $K_4$ is a constant between .02 and .20.

11. A hydroclone according to claim 10 in which the additional following relationship is satisfied:

$$K_5 = \frac{F_d \sqrt{Q}}{L_s D_u}$$

in which $L_s$ is the length of said subcone portion as measured parallel the conical axis in inches and $K_5$ is a constant between 1.2 and 3.0.

References Cited

UNITED STATES PATENTS

| | | | |
|---|---|---|---|
| 2,754,968 | 7/1956 | Vegter et al. | 209—211 |
| 3,235,090 | 2/1966 | Bose et al. | 210—512 |

JAMES DECESARE, Primary Examiner

U.S. Cl. X.R.

209—211